US012759168B2

(12) United States Patent
Fras et al.

(10) Patent No.: US 12,759,168 B2
(45) Date of Patent: Oct. 13, 2026

(54) GRIPPER ASSEMBLY FOR A ROBOTIC MANIPULATOR

(71) Applicant: OCADO INNOVATION LIMITED, Hatfield (GB)

(72) Inventors: Jan Fras, Hatfield (GB); Graham Deacon, Hatfield (GB); Panagiotis Sotiropoulos, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 81 days.

(21) Appl. No.: 18/692,511

(22) PCT Filed: Sep. 15, 2022

(86) PCT No.: PCT/EP2022/075645
§ 371 (c)(1),
(2) Date: Mar. 15, 2024

(87) PCT Pub. No.: WO2023/041644
PCT Pub. Date: Mar. 23, 2023

(65) Prior Publication Data

US 2024/0383154 A1 Nov. 21, 2024

(30) Foreign Application Priority Data

Sep. 15, 2021 (GB) ...................................... 2113167

(51) Int. Cl.
*B25J 15/00* (2006.01)
*B25J 13/08* (2006.01)
*B25J 15/02* (2006.01)

(52) U.S. Cl.
CPC ......... *B25J 15/0009* (2013.01); *B25J 13/082* (2013.01); *B25J 15/022* (2013.01)

(58) Field of Classification Search
CPC .... B25J 15/0009; B25J 13/082; B25J 15/022; B25J 9/0015; B25J 9/1694; B25J 9/1612;
(Continued)

(56) References Cited

U.S. PATENT DOCUMENTS 8,936,289 B1 * 1/2015 Kozlowski ........... B25J 19/0091
901/45
10,059,007 B1 8/2018 O'Conner et al.
(Continued)

FOREIGN PATENT DOCUMENTS

DE 102013113044 A1 6/2014
EP 2686144 B1 8/2015
(Continued)

OTHER PUBLICATIONS

Office Action issued on Feb. 5, 2025 by the Australian Patent Office in corresponding Australian Application No. 2022348822 (6 pages) corresponding to Applicant's U.S. Appl. No. 18/692,511.
(Continued)

*Primary Examiner* — Kira Nguyen
(74) *Attorney, Agent, or Firm* — Gregory Matt McCloskey

(57) ABSTRACT

This disclosure concerns ascertaining a force applied to a finger element of a gripper assembly of a robotic manipulator during the manipulation of an object. In one aspect, it discloses a gripper assembly including a finger element, an actuator, a linkage assembly including a plurality of arms connecting the finger element to the actuator, and a sensor assembly configured to output signals indicative of force components applied to the plurality of arms as a result of a force being applied to the finger element.

5 Claims, 9 Drawing Sheets

(58) Field of Classification Search
CPC ......... B25J 9/1633; G05B 2219/37274; G05B 2219/39528; G05B 2219/39532; G05B 2219/39322
USPC .......................................................... 700/258
See application file for complete search history.

(56) References Cited

U.S. PATENT DOCUMENTS

| | | | | |
|---|---|---|---|---|
| 2012/0239195 | A1* | 9/2012 | Summer | B25J 5/005 901/46 |
| 2013/0197697 | A1* | 8/2013 | Schaible | B25J 13/025 700/260 |
| 2014/0156066 | A1 | 6/2014 | Sakano | |
| 2018/0333858 | A1* | 11/2018 | Asano | B25J 13/082 |
| 2019/0168393 | A1* | 6/2019 | Strauss | B25J 15/12 |
| 2020/0056950 | A1* | 2/2020 | Strauss | B25J 13/085 |
| 2021/0122056 | A1* | 4/2021 | Menon | B25J 13/082 |
| 2023/0072770 | A1* | 3/2023 | Farnioli | G01L 5/16 |
| 2023/0264365 | A1* | 8/2023 | Maeda | B25J 15/08 700/253 |

FOREIGN PATENT DOCUMENTS

| | | | |
|---|---|---|---|
| JP | H6241925 | A | 9/1994 |
| JP | 2005335010 | A | 12/2005 |
| JP | 2020104203 | A | 7/2020 |

OTHER PUBLICATIONS

Office Action issued on Feb. 12, 2025 by the Japanese Patent Office in corresponding Japanese Application No. 2024-516683 (3 pages) corresponding to Applicant's U.S. Appl. No. 18/692,511.

International Search Report (PCT/ISA/210) and Written Opinion (PCT/ISA/237) mailed on Jan. 17, 2023, by the European Patent Office as the International Searching Authority for corresponding International Application No. PCT/EP2022/075645. (14 pages).

Patents Act 1977: Combined Search and Examination Report under Sections 17 and 18(3) mailed Feb. 27, 2023, for corresponding Application No. GB2213522.2 (6 pages).

Patents Act 1977: Combined Search and Examination Report under Sections 17 and 18(3) mailed Jun. 21, 2022, for corresponding Application No. GB2113167.7 (10 pages).

Rojas et al., "The GR2 Gripper: An Underactuated Hand for Open-Loop In-Hand Planar Manipulation", IEEE Transactions on Robotics, 2016, pp. 763-770, vol. 32.

* cited by examiner

GRIPPER ASSEMBLY FOR A ROBOTIC MANIPULATOR

TECHNICAL FIELD

The present disclosure concerns ascertaining a force applied to a finger element of a gripper assembly of a robotic manipulator during the manipulation of an object. Aspects of the invention relate to the gripper assembly, a control system for the robotic manipulator, and to a method of determining a force applied to a finger element of a gripper assembly.

BACKGROUND

An important aspect when using a robotic manipulator during a picking and packing process is being able to determine the state of an object or item being handled. This is done through the use of sensors that detect the presence of the object, interaction forces, contact properties, etc. A known approach is to apply sensors directly on the finger elements of the robotic manipulator as this is where the intended interaction occurs between the manipulator and the object being handled.

This approach is shown in DE102013113044 A1, which discloses a robotic gripping hand in which force sensors are built into finger elements in order to determine the force applied to an object during its manipulation. As set out in paragraph 11, in the general concept disclosed in this document, a force sensor is provided in a finger element used to grasp an object, so that the grasping force can be stably and accurately detected over a wide range. Two embodiments of the robotic gripping hand are shown. In the first embodiment, the base portions of the finger elements are provided with force sensors, and the actuator, which includes a motor, a reduction gear and a linear drive mechanism, are connected to the finger elements via the force sensors. In the second embodiment, the finger elements each comprise two sections, and a force sensor is positioned at a joint between the two sections to detect torque acting on one of the two sections.

There are, however, some issues associated with such an approach. First, sensors often are sub-optimal in terms of the requirements of finger elements (such as compliance, friction, flexibility, etc.), and so their integration into finger elements often compromises performance in one way or another. Second, sensors are often unable to cover the whole surface where the interaction occurs, resulting in “blind spots” on the finger elements where interaction forces cannot be detected. Third, sensors require electrical connections routed through or along the whole robotic manipulator up to the finger elements, complicating the overall construction of the manipulator and making replacement of the finger elements cumbersome. Fourth, additional high-friction, high-compliance layers, which are often used in finger elements, potentially interfere with the accuracy of sensors.

It is against this background that the invention has been devised.

SUMMARY

Accordingly, there is provided, in a first aspect, a gripper assembly for a robotic manipulator, the gripper assembly comprising: a finger element; that is, the part of the gripper assembly configured to engage an object to be manipulated, an actuator, a linkage assembly comprising a plurality of arms connecting the finger element to the actuator, and a sensor assembly configured to output signals indicative of force components applied to the plurality of arms as a result of a force being applied to the finger element. The force components can then be used to determine the magnitude and direction of the force being applied to the finger element. By instrumenting the arms of the linkage assembly with a sensor assembly, such as a plurality of load cells, rather than the finger element itself, one is able to measure the number of values describing the interaction between the finger element and an object being manipulated, including all three force components and the point where the force is applied to the finger element. That is, this novel arrangement enables one to ascertain the forces that are transmitted through the linkage assembly via the finger element during the manipulation of an object, and then calculate the resultant force applied to the finger element that is required to cause the ascertained forces acting on the linkage assembly.

Since the sensor assembly is configured to output signals indicative of force components applied to the linkage assembly and is not applied to the finger element itself, the finger element is unaffected, meaning any modifications to the finger element are inconsequential in terms of the ability to calculate the applied force. The finger element can, therefore, be seamlessly exchanged, modified, etc.

Optionally, the plurality of arms are arranged to define two substantially parallel closed kinematic chains connected to the finger element.

Optionally, the sensor assembly is further configured to output signals indicative of a force component applied directly to the linkage assembly during the manipulation of an object.

In a second aspect, there is provided a control system for a robotic manipulator comprising a gripper assembly, the gripper assembly comprising: a finger element; an actuator; a linkage assembly comprising a plurality of arms connecting the finger element to the actuator; and, a sensor assembly configured to output signals indicative of force components applied to the plurality of arms, the control system comprising a controller configured to: determine, based on signals outputted by the sensor assembly, values indicative of force components applied to each of the plurality of arms as a result of a force being applied to the finger element; determine, based on the values indicative of the force components, a value indicative of a resultant force vector applied to each of the plurality of arms; and, determine, based on the values indicative of the resultant force vectors, a value indicative of an applied force vector indicative of the magnitude and direction of the force applied to the finger element.

Optionally, the plurality of arms are arranged to define two substantially parallel closed kinematic chains connected to the finger element.

Optionally, the controller is further configured to determine the values indicative of the resultant force vectors with respect to a reference coordinate frame.

Optionally, the controller is further configured to determine, within the reference coordinate frame, a line of action for each of the values indicative of the resultant force vectors; and, determine a point, within the reference coordinate system, at which the lines of action intersect.

Optionally, the controller is further configured to determine the value indicative of the applied force vector based on a sum of the values indicative of the resultant force vectors; and, modify the value indicative of the applied force vector such that the origin of the applied force vector has the same coordinates within the reference coordinate system as the point of intersection.

Optionally, the controller is further configured to determine, within the reference coordinate frame, a line of action for the value indicative of the applied force vector; and, determine a point, within the reference coordinate frame, at which the line of action for the applied force vector and the finger element intersect.

Optionally, the controller is further configured to determine the reference coordinate system with respect to characteristics of the linkage assembly.

In a third aspect, there is provided a method of determining a force applied to a finger element of a gripper assembly of a robotic manipulator, the gripper assembly further comprising: an actuator; a linkage assembly comprising a plurality of arms connecting the finger element to the actuator; and, a sensor assembly configured to output signals indicative of force components applied to the plurality of arms; the method comprising: determining, based on signals outputted by the sensor assembly, force components applied to each of the plurality of arms as a result of a force being applied to the finger element; determining, based on the force components, a resultant force vector applied to each of the plurality of arms; and, determining, based on the resultant force vectors, an applied force vector indicative of the magnitude and direction of the force applied to the finger element.

Optionally, the method further comprises determining the resultant force vectors with respect to a reference coordinate frame.

Optionally, the method further comprises determining, within the reference coordinate frame, a line of action for each of the resultant force vectors; and, determining a point, within the reference coordinate frame, at which the lines of action intersect.

Optionally, the method further comprises determining the applied force vector based on a sum of the resultant force vectors; and, transposing the applied force vector, within the reference coordinate frame, such that the origin of the applied force vector and the point of intersection coincide.

Optionally, the method further comprises determining, within the reference coordinate frame, a line of action for the applied force vector; and, determining a point, within the reference coordinate frame, at which the line of action for the applied force vector and the finger element intersect.

Optionally, the method further comprises determining the reference coordinate system with respect to characteristics of the linkage assembly.

In a fourth aspect, there is provided a robotic picking system comprising a robotic manipulator comprising a gripper assembly according to the fourth aspect, wherein the robotic picking system is configured to perform a method according to the third aspect.

In a fifth aspect, there is provided computer software that, when executed, is arranged to perform a method according to the third aspect.

In a sixth aspect, there is provided a non-transitory, computer-readable storage medium storing instructions thereon that, when executed by one or more electronic processors, cause the one or more electronic processors to carry out a method according to the third aspect.

BRIEF DESCRIPTION OF THE DRAWINGS

These and other aspects of the invention will now be described, by way of example only, with reference to the accompanying drawings, in which.

Figure 1:
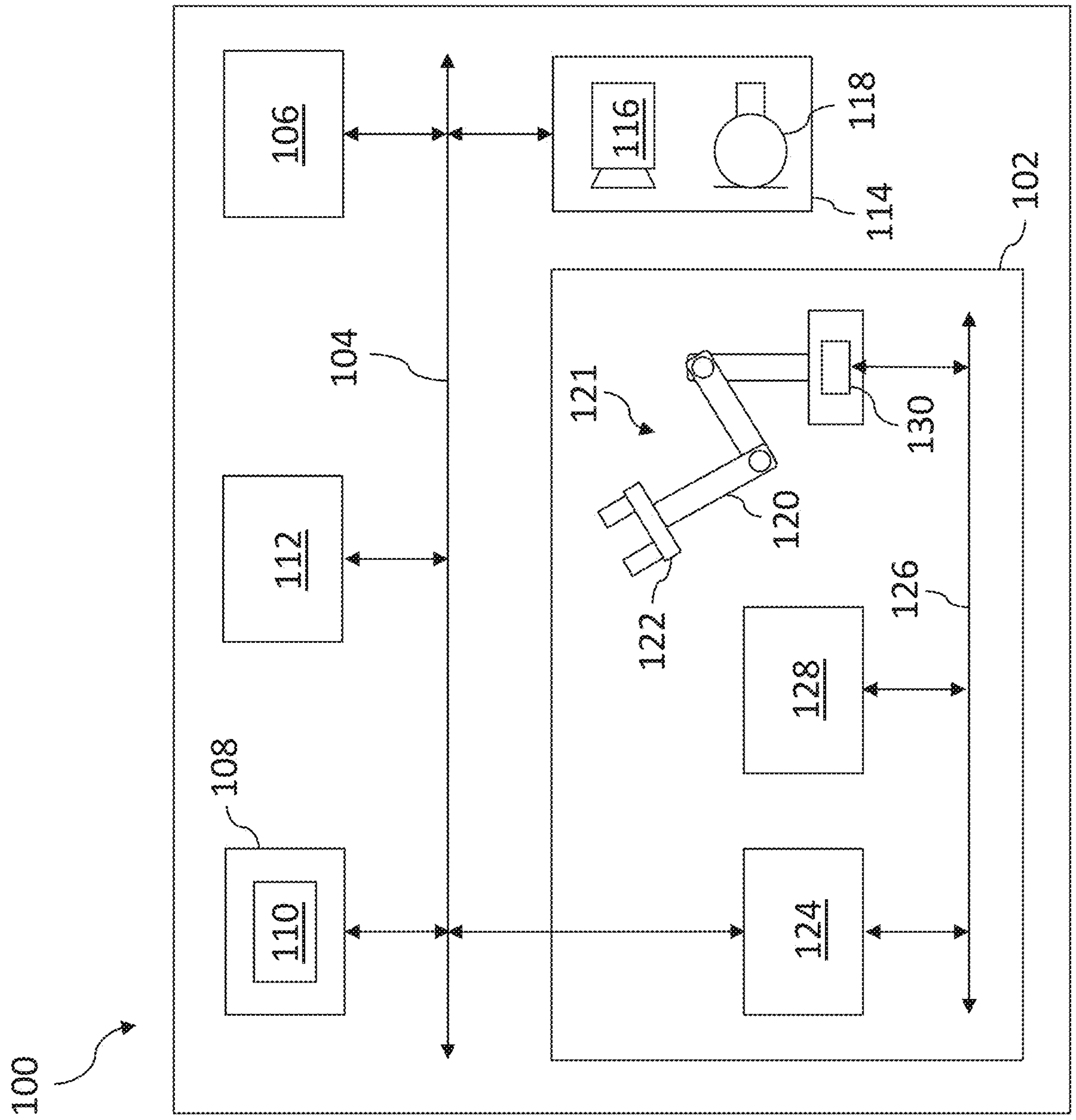
FIG. 1 is a schematic depiction of a robotic picking system comprising a robotic manipulator according to an embodiment of the invention.

In the drawings, like features are denoted by like reference signs where appropriate.

DETAILED DESCRIPTION

In the following description, some specific details are included to provide a thorough understanding of various disclosed embodiments. One skilled in the relevant art, however, will recognise that embodiments may be practiced without one or more of these specific details, or with other methods, arrangements, components, materials, etc. In some instances, well-known structures associated with gripper assemblies and/or robotic manipulators, such as processors, sensors, storage devices, network interfaces, workpieces, tensile members, fasteners, electrical connectors, mixers, and the like are not shown or described in detail to avoid unnecessarily obscuring descriptions of the disclosed embodiments.

Unless the context requires otherwise, throughout the specification and the appended claims, the word "comprise" and variations thereof, such as, "comprises" and "comprising" are to be construed in an open, inclusive sense; that is, as "including, but not limited to."

Reference throughout this specification to "one", "an", or "another" applied to "embodiment" or "example", means that a particular referent feature, structure, or characteristic described in connection with the embodiment, example, or implementation is included in at least one embodiment, example, or implementation. Thus, the appearances of the phrase "in one embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the users forms "a", "an", and "the" include plural referents unless the content clearly dictates otherwise. Thus, for example, reference to a gripper assembly including "a finger element" includes a finger element, or two or more finger elements. It should also be noted that the term "or" is generally employed in its sense including "and/or" unless the content clearly dictates otherwise.

With reference to FIG. 1, there is illustrated an example of a robotic picking system 100 such that may be adapted for use with the present assemblies, devices, and methods. The robotic picking system 100 may form part of an online retail operation, such as an online grocery retail operation, but may also be applied to any other operation requiring the picking and/or sorting of items. In this example, the robotic picking system 100 includes a manipulator apparatus 102 comprising a robotic manipulator 121 configured to pick an item from a first location and place the item in a second location. The manipulator apparatus 102 is communicatively coupled via a communication interface 104 to other components of the robotic picking system 100, such as to one or more optional operator interfaces 106, from which an observer may observe or monitor the operation of the system 100 and the manipulator apparatus 102. The observer interfaces 106 may include a WIMP interface and an output display of explanatory text or a dynamic representation of the manipulator apparatus 102 in a context or scenario. For example, the dynamic representation of the manipulator apparatus 102 may include video and audio feed, for instance a computer-generated animation. Examples of suitable communication interface 104 include a wire based network or communication interface, optical based network or communication interface, wireless network or communication interface, or a combination of wired, optical, and/or wireless networks or communication interfaces.

The robotic picking system 100 further comprises a control system 108 including at least one controller 110 communicatively coupled to the manipulator apparatus 102 and the other components of the robotic picking system 100 via the communication interface 104. The controller 110 comprises a control unit or computational device having one or more electronic processors, within which is embedded computer software comprising a set of control instructions provided as processor-executable data that, when executed, cause the controller 110 to issue actuation commands or control signals to the manipulator system 102, causing the manipulator 121 to carry out various methods and actions, e.g., identify and manipulate items. The one or more electronic processors may include at least one logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUS), or the like. In some implementations, the controller 110 is a smaller processor-based device like a mobile phone, single board computer, embedded computer, or the like, which may be termed or referred to interchangeably as a computer, server, or an analyser. The set of control instructions may also be provided as processor-executable data associated with the operation of the system 100 and manipulator apparatus 102 included in a non-transitory computer-readable storage device 112, which forms part of the robotic picking system 100 and is accessible to the controller 110 via the communication interface 104. In some implementations, storage device 112 includes two or more distinct devices. The storage device 112 can, for example, include one or more volatile storage devices, for instance random access memory (RAM), and one or more non-volatile storage devices, for instance read only memory (ROM), flash memory, magnetic hard disk (HDD), optical disk, solid state disk (SSD), or the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed.

The robotic picking system 100 includes a sensor subsystem 114 comprising one or more sensors that detect, sense, or measure conditions or states of manipulator apparatus 102 and/or conditions in the environment or workspace in which the manipulator 121 operates, and produce or provide corresponding sensor data or information. Sensor information includes environmental sensor information, representative of environmental conditions within the workspace of the manipulator 121, as well as information representative of condition or state of the manipulator apparatus 102, including the various subsystems and components thereof, and characteristics of the item to be manipulated. The acquired data may be transmitted via the communication interface 104 to the controller 110 for directing the manipulator 121 accordingly. Such information can, for example, include diagnostic sensor information that is useful in diagnosing a condition or state of the manipulator apparatus 102 or the environment in which the manipulator 121 operates. For example, such sensors may include contact sensors, force sensors, strain gages, vibration sensors, position sensors, attitude sensors, accelerometers, and the like. Such sensors may include one or more of cameras or imagers 116 (e.g., responsive in visible and/or nonvisible ranges of the electromagnetic spectrum including for instance infrared and ultraviolet), radars, sonars, touch sensors, pressure sensors, load cells, microphones 118, meteorological sensors, chemical sensors, or the like. In some implementations, the diagnostic sensors include sensors to monitor a condition and/or health of an on-board power source within the manipulator apparatus 102 (e.g., battery array, ultra-capacitor array, fuel cell array). In some implementations, the one or more sensors comprise receivers to receive position and/or orientation information concerning the manipulator 121. For example, a global position system (GPS) receiver to receive GPS data, two more time signals for the controller 110 to create a position measurement based on data in the signals, such as, time of flight, signal strength, or other data to effect a position measurement. Also, for example, one or more accelerometers, which also form part of the manipulator apparatus 102, could be provided on the manipulator 121 to acquire inertial or directional data, in one, two, or three axes, regarding the movement thereof.

The manipulator 121 may be piloted by a human operator at the operator interface 106. In human operator controlled or piloted mode, the human operator observes representations of sensor data, for example, video, audio, or haptic data received from one or more sensors of the sensor subsystem 114. The human operator then acts, conditioned by a perception of the representation of the data, and creates information or executable control instructions to direct the manipulator 121 accordingly. In piloted mode, the manipulator apparatus 102 may execute control instructions in real-time (e.g., without added delay) as received from the operator interface 106 without taking into account other control instructions based on sensed information.

In some implementations, the manipulator apparatus 102 operates autonomously. That is, without a human operator creating control instructions at the operator interface 106 for directing the manipulator 121. The manipulator apparatus 102 may operate in an autonomous control mode by executing autonomous control instructions. For example, the controller 110 can use sensor data from one or more sensors of the sensor subsystem 114, the sensor data being associated with operator generated control instructions from one or more times the manipulator apparatus 102 was in piloted mode to generate autonomous control instructions for subsequent use. For example, by using deep learning techniques to extract features from the sensor data such that in autonomous mode the manipulator apparatus 102 autonomously recognize features or conditions in its environment and the item to be manipulated, and in response perform a defined act, set of acts, a task, or a pipeline or sequence of tasks. In some implementations, the controller 110 autonomously recognises features and/or conditions in the environment surrounding the manipulator 121, as represented by a sensor data from the sensor subsystem 114 and one or more virtual items composited into the environment, and in response to being presented with the representation, issue control signals to the manipulator apparatus 102 to perform one or more actions or tasks.

In some instances, the manipulator apparatus 102 may be controlled autonomously at one time, while being piloted, operated, or controlled by a human operator at another time. That is, operate under an autonomous control mode and change to operate under a piloted mode (i.e., non-autonomous). In another mode of operation, the manipulator apparatus 102 can replay or execute control instructions previously carried out in a human operator controlled (or piloted) mode. That is, the manipulator apparatus 102 can operate without sensor data based on replayed pilot data.

The manipulator apparatus 102 further includes a communication interface subsystem 124 (e.g., a network interface device) that is communicatively coupled to a bus 126 and provides bidirectional communication with other components of the system 100 (e.g., the controller 110) via the communication interface 104. The communication interface subsystem 124 may be any circuitry affecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI™ compliant, BLUETOOTH™ compliant, cellular (e.g., GSM, CDMA), and the like.

The manipulator 121 is an electro-mechanical machine comprising one or more appendages, such as a robotic arm 120, and a gripper assembly or end-effector 122 mounted on an end of the robotic arm 120. The gripper assembly 122 is a device of complex design configured to interact with the environment in order to perform a number of tasks, including, for example, gripping, grasping, releasably engaging or otherwise interacting with an item. The manipulator apparatus 102 further includes a motion subsystem 130, communicatively coupled to the robotic arm 120 and gripper assembly 122, comprising one or more motors, solenoids, other actuators, linkages, drive-belts, and the like operable to cause the robotic arm 120 and/or gripper assembly 122 to move within a range of motions in accordance with the actuation commands or control signals issued by the controller 110. The motion subsystem 130 is communicatively coupled to the controller 110 via the bus 126.

The manipulator apparatus 102 also includes an output subsystem 128 comprising one or more output devices, such as speakers, lights, and displays that enable the manipulator apparatus 102 to send signals into the workspace in order to communicate with, for example, an operator and/or another manipulator apparatus 102.

A person of ordinary skill in the art will appreciate the components in manipulator apparatus 102 may be varied, combined, split, omitted, or the like. In some examples one or more of the communication interface subsystem 124, the output subsystem 128, and/or the motion subsystem 130 may be combined. In other examples, one or more of the subsystems (e.g., the motion subsystem 130) are split into further subsystems.

Figure 2A:
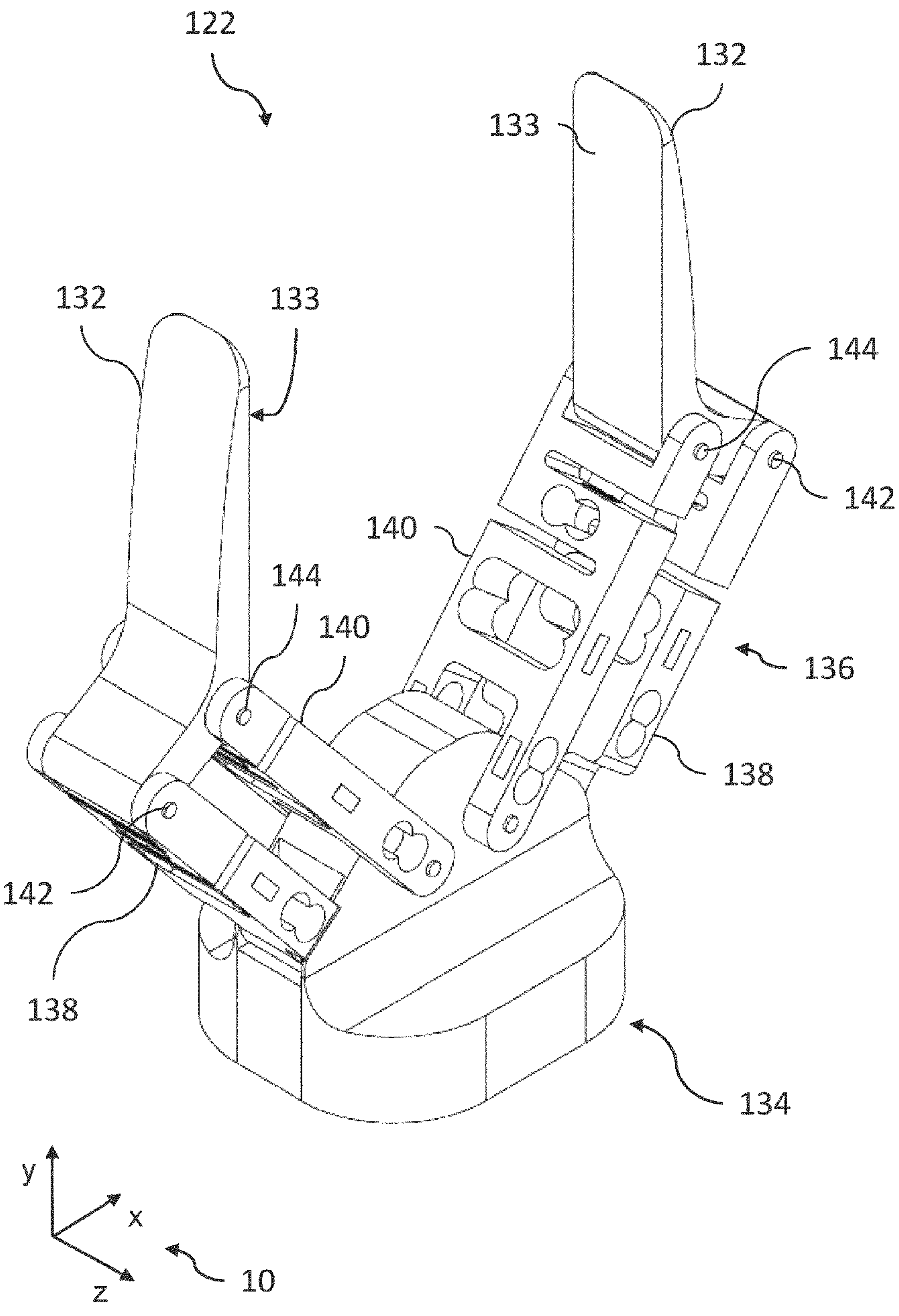
FIG. 2*a* is an isometric view of a gripper assembly of the robotic manipulator of FIG. 1.
Figure 2B:
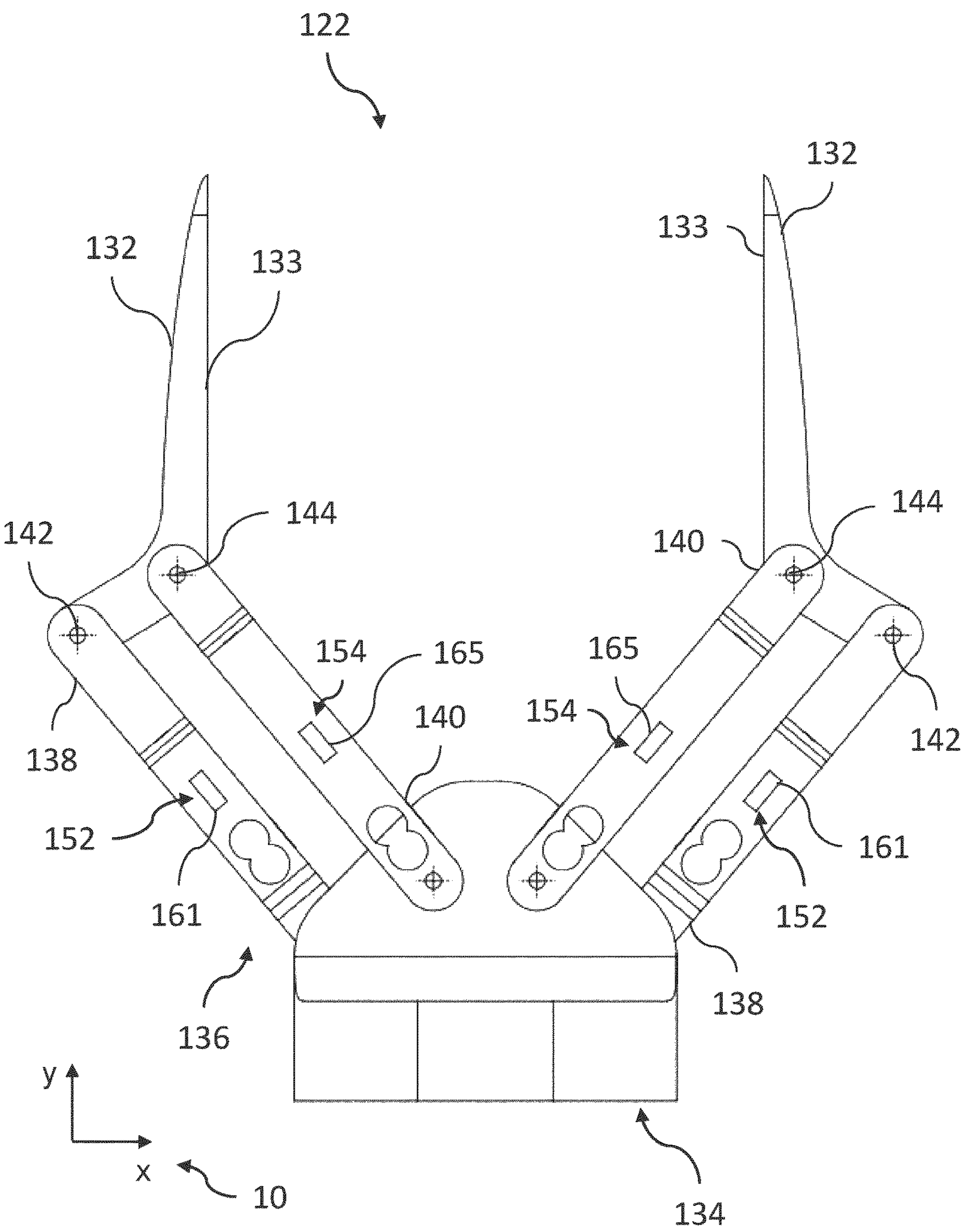
FIG. 2*b* is a side view of the gripper assembly of FIG. 2.

The manipulator 121 is configured to move articles, objects, work pieces, or items from a first location, such as a storage tote box, and place the item in a second location, such as a delivery tote box, and FIGS. 2*a* and 2*b* show an example of a gripper assembly 122 suitable for carrying out such operations.

In this example, the gripper assembly 122 comprises two finger elements 132 defining opposed gripping surfaces 133 configured to grasp an object to be manipulated, along with a housing 134 within which at least part of the actuator is housed. The gripper assembly 122 further comprising a linkage assembly, generally designated by 136, connecting the finger elements 132 to the actuator. The actuator and linkage assembly 136 are configured in use to move the finger elements 132 towards or away from each other in a generally parallel orientation in accordance with actuation commands or control signals issued by the controller 110. In this implementation, the linkage assembly 136 comprises two sets of linkage arms connecting a respective finger element 132 to the actuator. Each set of linkage arms comprises a driven or active arm 138, connected to the actuator for transferring the movement thereof to the finger element 132, and a passive arm 140, which is rotatably attached to the housing 134 and is used to guide the movement of the finger element 132 and maintain the parallel orientation of the gripping surface 133 during the movement of the finger elements 132. The active and passive arms 138, 140 are arranged to define two substantially parallel closed kinematic chains or links connected to the finger elements 132 by first and second connecters 142, 144 respectively.

Figure 3A:
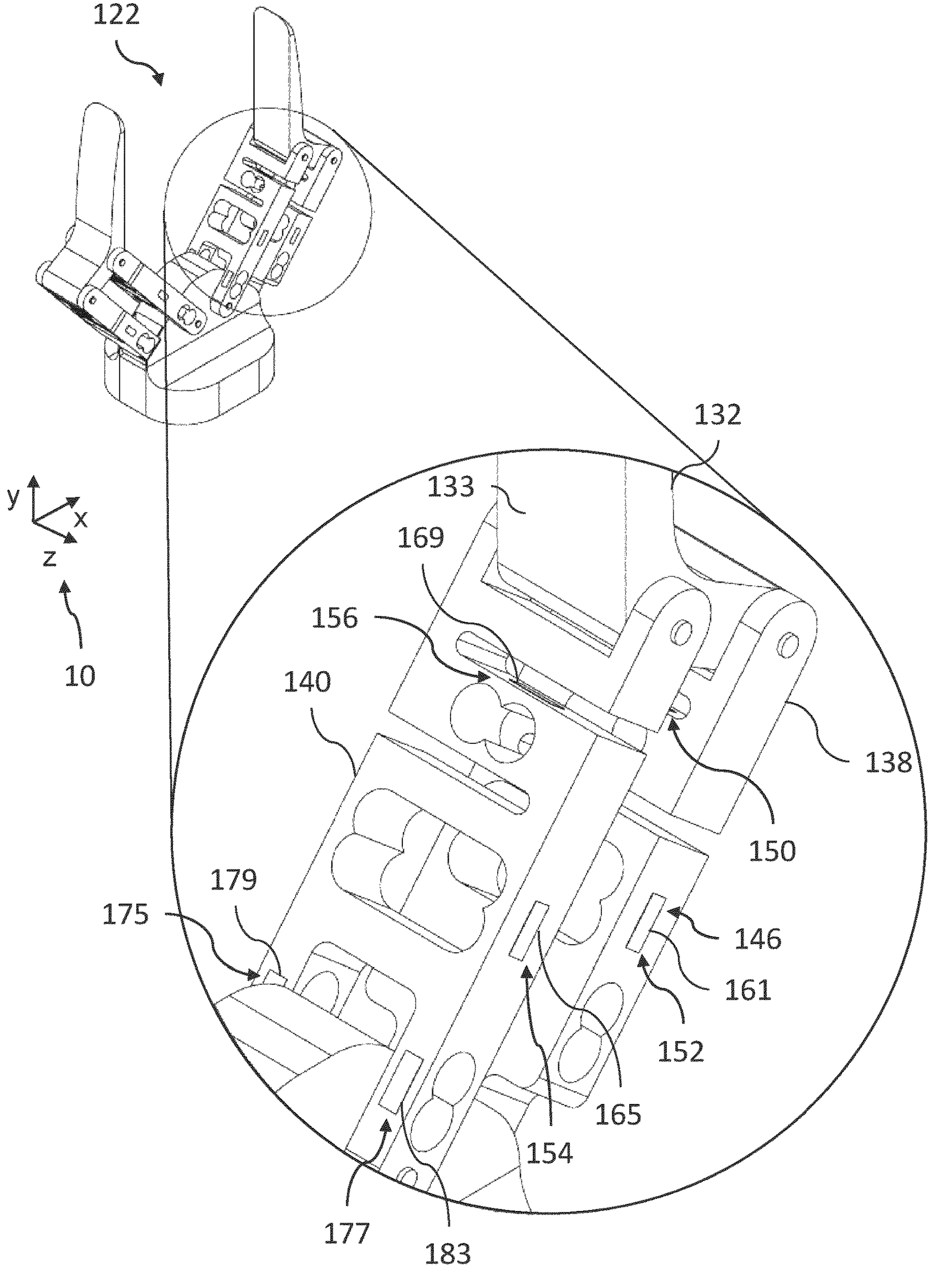
FIG. 3*a* is an enlarged isometric view of part of a linkage assembly of the gripper assembly of FIG. 2.
Figure 3B:
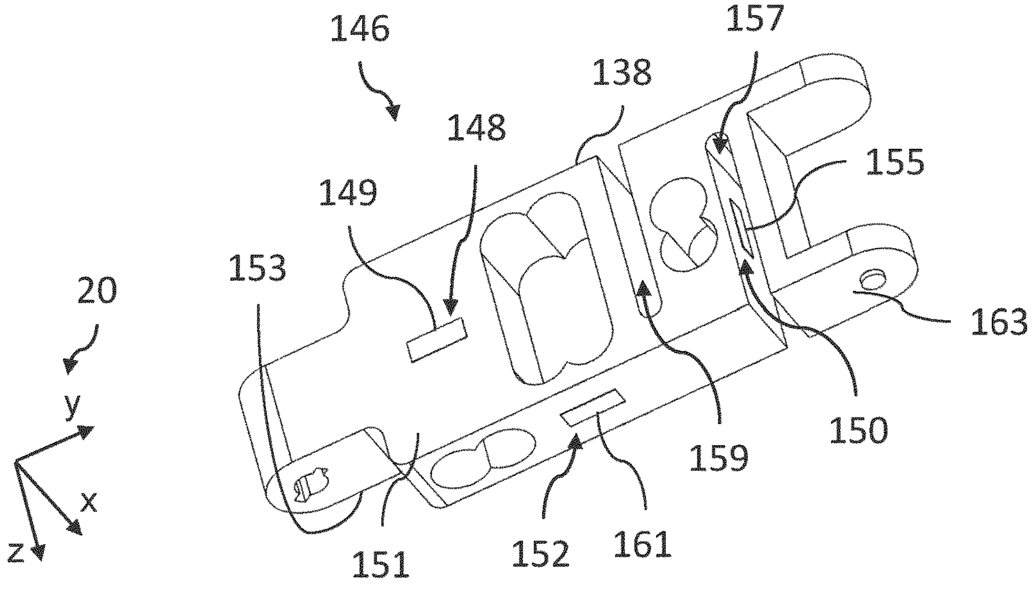
FIG. 3*b* is an isometric view of an active link of the linkage assembly of FIG. 3*a;*
Figure 3C:
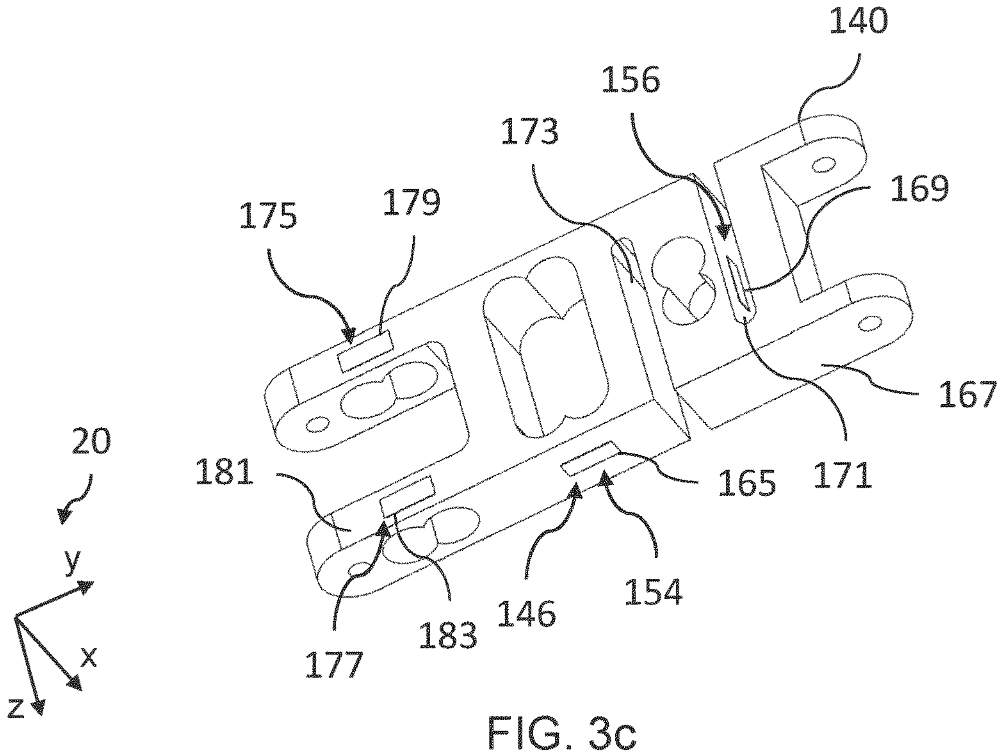
FIG. 3*c* is an isometric view of a passive link of the linkage assembly of FIG. 3*a;*

With reference to FIGS. 3*a* to 3*c*, the gripper assembly 122 further comprises a novel sensor assembly, generally designated by 146. The sensor assembly 146 is an arrangement of load cells configured to output, in this example, to the controller 110, signals indicative of force components applied to the active and passive arms 138, 140 as a result of a force being applied to the finger elements 132 during the manipulation of an item. Torque applied by the actuator at one end of the active arm 138 results in a force at the other end of the arm 138 that move a respective finger element 132 towards or away from the opposing finger element 132. Considered in the reverse, any force applied to the finger element 132, results in a bending moment acting on the active arm 138 and consequently on the rotation axis, where it is connected to the actuator. As a result of this arrangement, forces in all three x-, y- and z-directions can be generated in the active arm 138. In this example, the x-, y-, z-axes or directions form a three-dimensional Cartesian coordinate system 20 local to the active and passive arms 138, 140 as shown in FIGS. 3*b* and 3*c*. In this system, the positive y-axis extends in a direction along the major or longitudinal axis of the arms 138, 149 from one end, configured to be attached to the actuator/housing 134, to the other end, arranged to be connected the finger elements 132. The positive x-axis extends perpendicularly with respect to the y-axis through the active and passive arms 138, 140, from the top 151, 181 to the bottom sides of the arms 138, 140. The z-axis extends in the general direction from the upper edge to the lower side of the arms 138, 140 as they are orientated in FIGS. 3*b* and 3*c*.

The passive arm 140, on the other hand, is arranged to rotate freely at both of its ends and, therefore, no torque can be transmitted via its connection to the housing 134 or finger element 132. Because of that, any force applied to the finger element 132 does not give rise to a force in the passive arm 140 in the x-direction, but only in the y- and z-directions.

In this implementation, therefore, the sensor assembly 146 comprises five load cells 148, 150, 152, 154, 156, each consisting of two pairs of strain gauges, with each pair being positioned at opposing locations on the arms 138, 140.

With reference to FIG. 3*b*, the active arm 138 comprises three load cells 148, 150, 152 for determining force components applied to the arm 138 in the x-, y-, z-directions or axes, respectively. One of the load cells 148, comprising a pair of strain gauges 149 located on the top side 151 of the arm 138 and an opposing pair of strain gauges (not shown) located on a bottom side 153 of the arm 138, is arranged to determine a force in the z-direction. Another one of the load cells 150, comprising a pair of strain gauges 155 located in a crosswise cut out 157 in the arm 138 and an opposing pair of strain gauges (not shown) located in another crosswise cut out 159, is arranged to determine a force in the x-direction. The final load cell 152 on the active arm 138 comprises a pair of strain gauges 161 located on one side 163 of the arm 138 and an opposing pair of strain gauges (not shown) located on the other side of the arm 138 and is arranged to determine a force acting on the arm 138 in the y-direction.

Referring to FIG. 3*c*, as mentioned above, in this implementation of the gripper assembly 122, any force applied to the finger element 132 only gives rise to force components in the y- and z-directions in the passive arm 140, and not a force component in the x-direction. To that end, the passive arm 140 comprises only two load cells 154, 156 for determining force components applied to the arm 140 in the z- and y-directions. One of the load cells 154 comprises a pair of strain gauges 165 positioned on one side 167 of the arm 140 and an opposing pair of strain gauges (not shown) located on the other side of the arm 140 and is arranged to determine a force acting on the arm 140 in the z-direction. The other load cell 156 includes a pair of strain gauges 169 located in a crosswise cut out 171 in the arm 140 and an opposing pair of strain gauges (not shown) located in another crosswise cut out 173 and is arranged to determine a force component acting on the passive arm 140 in the y-direction.

In addition to using the sensor assembly 146 on the linkage assembly 136 to ascertain indirectly a force applied to the finger element 132, it is also advantageous to detect instances when a force is applied directly to the linkage assembly 136 itself. Such instances can be used to highlight situations in which the indirect measurement of the force applied to the finger element 132 might be unreliable. For example, if an object is grasped by the gripper assembly 122 in such a way that part of the object rests on or is supported by the linkage assembly 136, not all of the force acting on the object by the gripper assembly 122 is applied through the finger elements 132. In this case, determining the force applied by the finger elements 132 using indirect means may provide an unreliable or incomplete view of the situation. Therefore, optionally, the passive arm 140 can be equipped with one or more additional load cells arranged in such a way that they are not engaged when a force is applied to the finger elements 132, but signify a force whenever a load is applied directly on the passive arm 140. To that end, in this example, the passive arm 140 comprises two additional load cells 175, 177 suitably arranged such that they are isolated from any forces applied to the finger elements 132, but register loads applied directly to the passive arm 140. As mentioned above, no force components in the x-direction are generated in the passive arm 140 when a force is applied to the finger element 132. Therefore, in order to detect a force on the passive arm 140 that does not originate from the finger element 132, the load cells 175, 177 are arranged to register force components in the x-direction. One of the load cells 175 comprises a pair of strain gauges 179 located on the top side 181 of the arm 140 and an opposing pair of strain gauges (not shown) located on a bottom side of the arm 140. Similarly, the other load cell 177 comprises a pair of strain gauges 183 positioned on the top side 181 of the arm 140 and an opposing pair of strain gauges (not shown) located on the bottom side of the arm 140.

Figure 4:
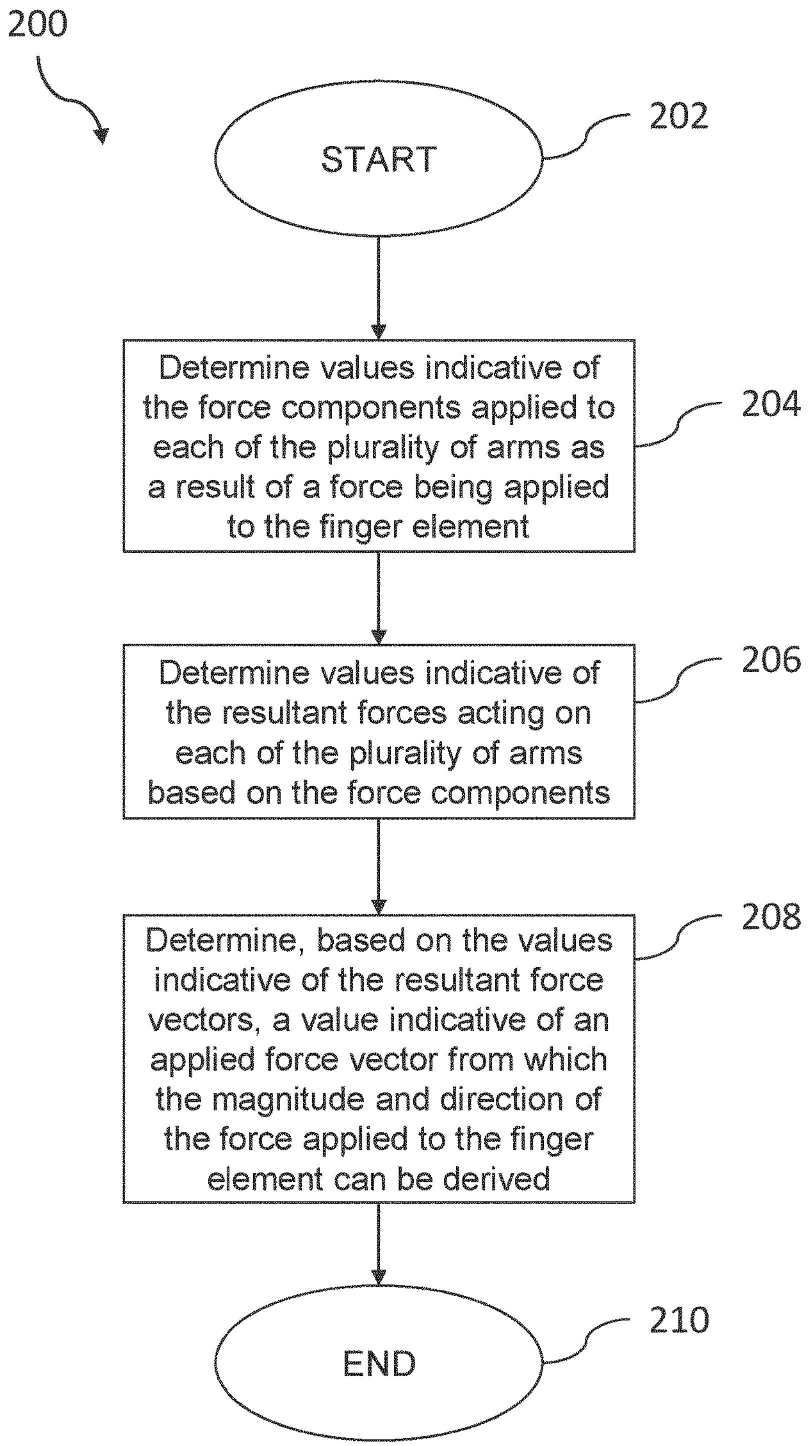
FIG. 4 is a process flowchart.

With reference to FIG. 4, upon receipt of the signals indicative of the force components generated in the active and passive arms 138, 140, the controller 110 is configured to carry out process 200, which starts a step 202. Following that, at step 204, the controller 110 is configured to determine, based on signals outputted by the sensor assembly 146, values indicative of the force components applied to active and passive arms 138, 140 as a result of a force being applied to their respective finger element 132. Once the values indicative of the force components have been derived, the process 200 moves onto step 206, where the controller 110 is configured to determine, based on the values indicative of the force components, values indicative of a resultant force vector applied to each of the active and passive arms 138, 140. The controller 110 is then configured, at step 208, to determine, based on the values indicative of the resultant force vectors, an value indicative of an applied force vector from which the magnitude and direction of the force applied to the finger element 132, after which the process 200 finishes at step 210.

Figure 5A:
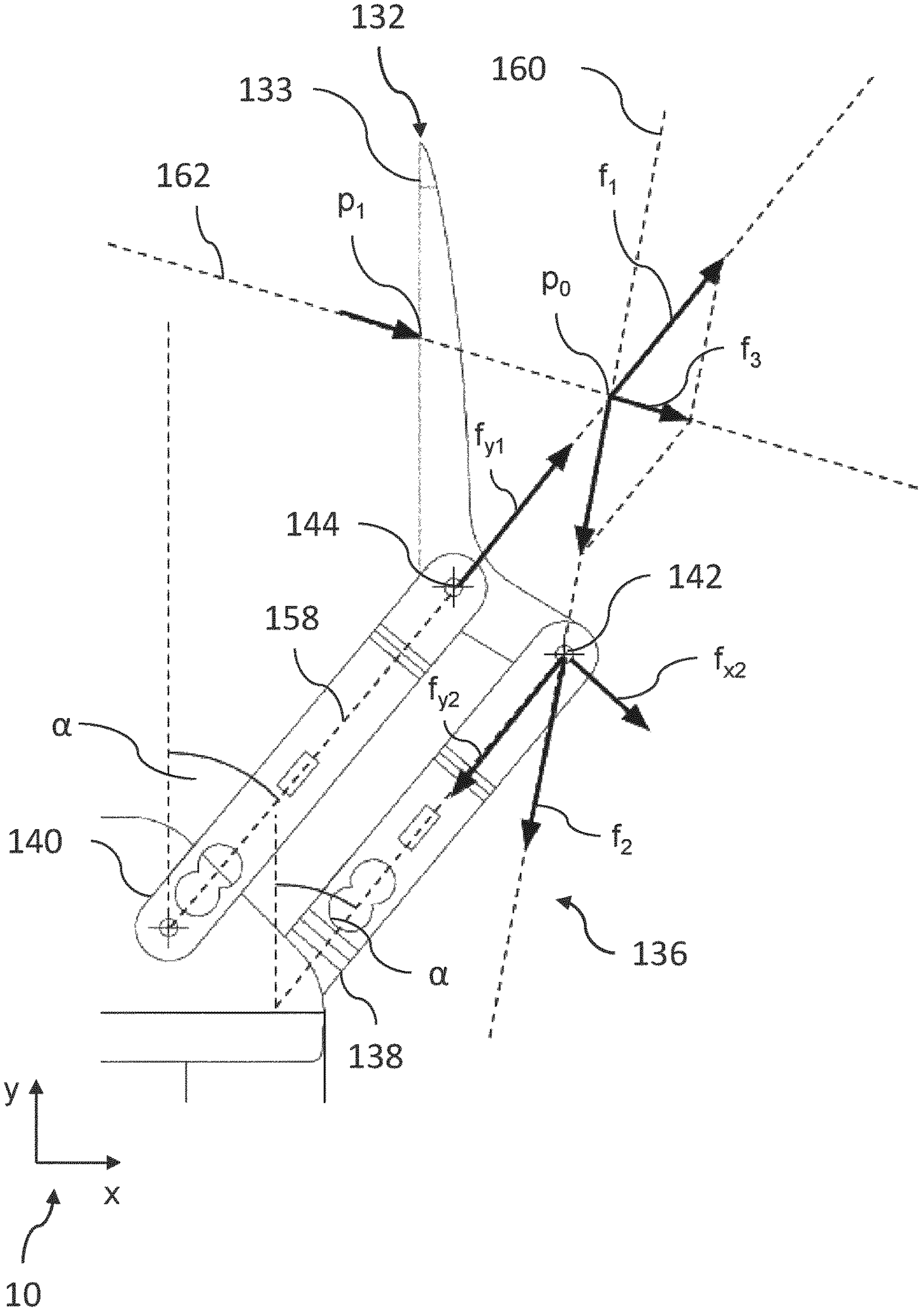
FIG. 5*a* is a side view of the part of the linkage assembly of FIG. 3*a;*
Figure 5B:
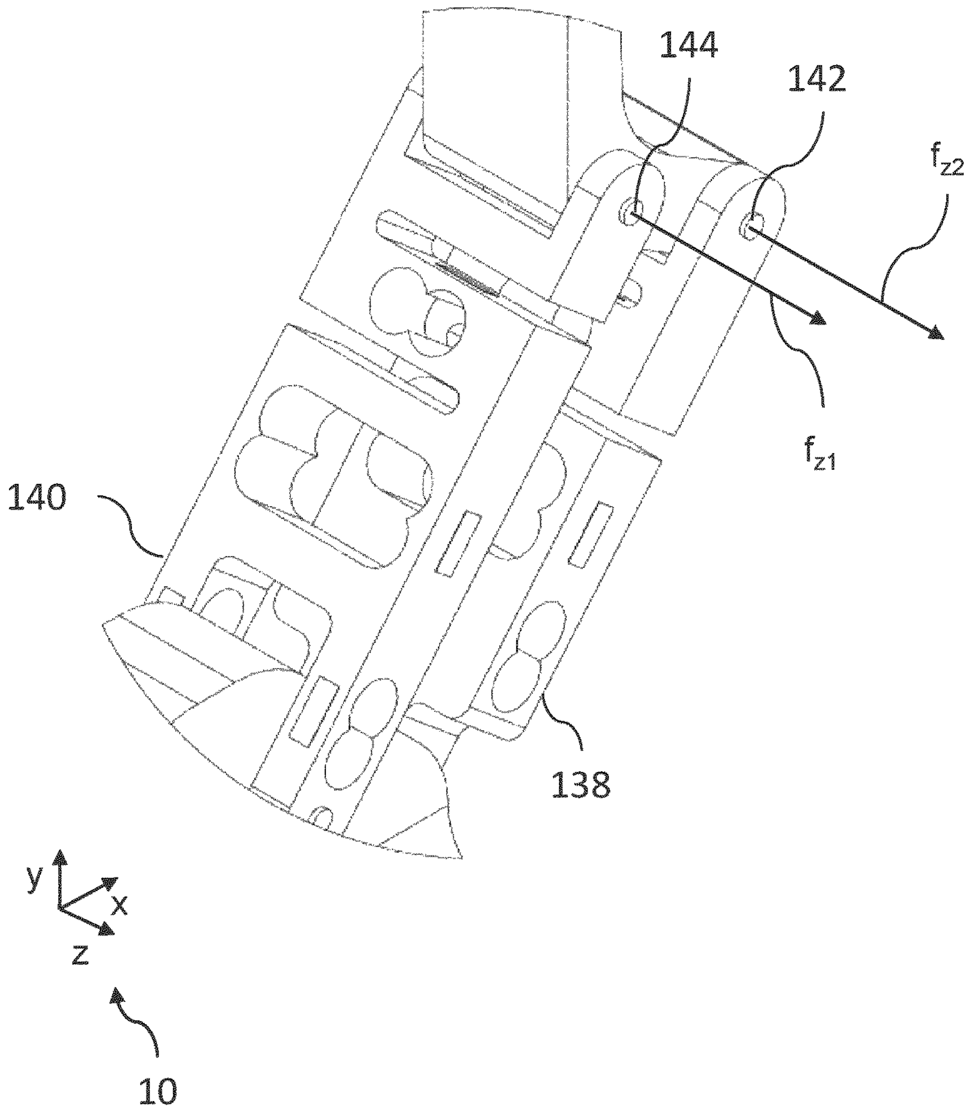
FIG. 5*b* is a isometric view of the part of the linkage assembly of FIG. 3*a*; and, FIG. 6 is a process flowchart.
Figure 6:
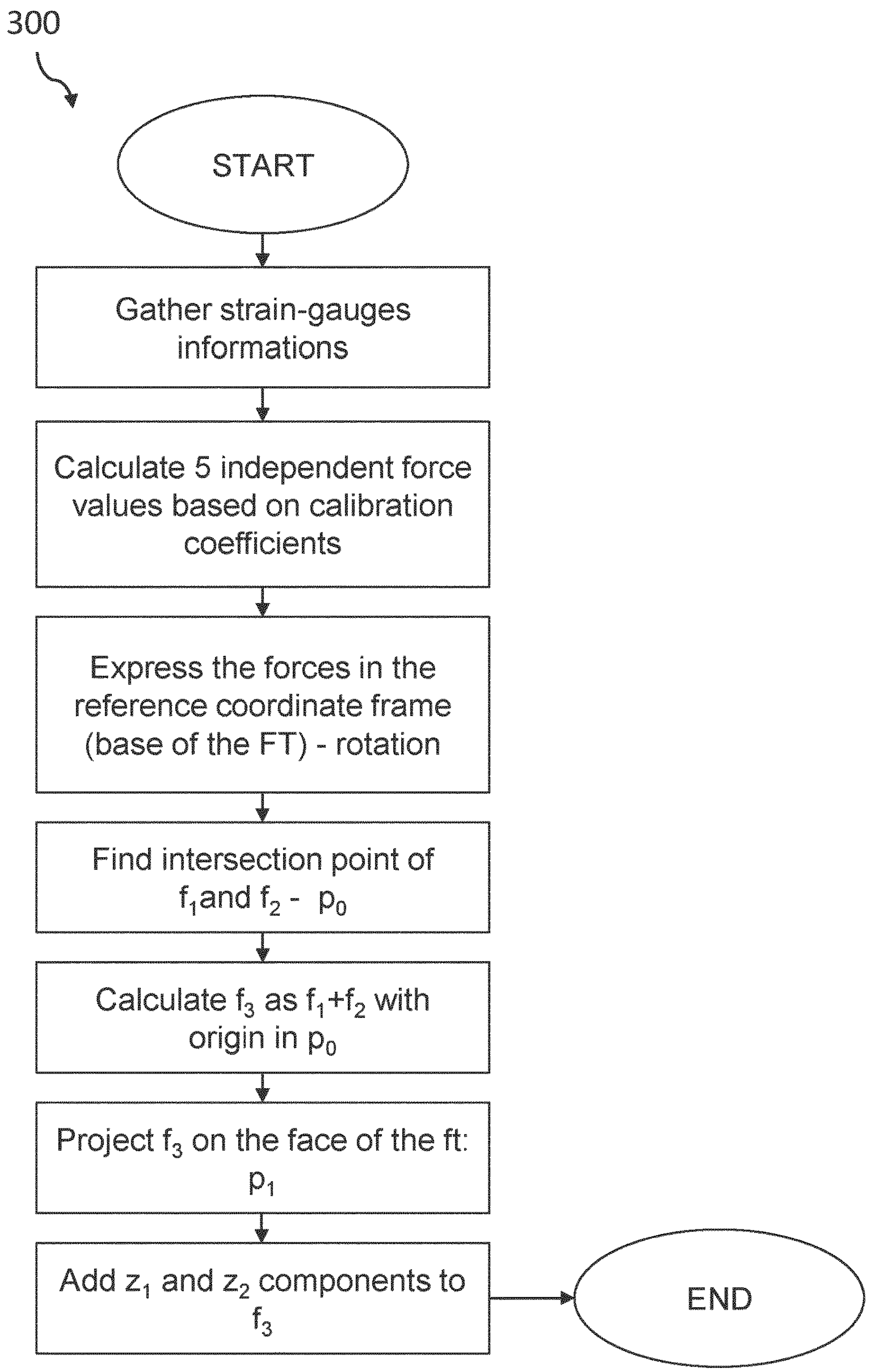

An explanation of an example by which the process 200 might be carried out will now be explained with reference to FIGS. 5*a* and 5*b*. First, the five independent force components, which in this example are $f_{Y1}$, $f_{X2}$ and $f_{Y2}$ as shown in FIG. 5*a*, and $f_{Z1}$ and $f_{Z2}$ as shown in FIG. 5*b*, are determined based on signals outputted by the load cells 148, 150, 152, 154, 156, taking into account their respective calibration coefficients. The resultant force vectors, $f_1$, $f_2$, within an x-y plane of a global reference coordinate system 10, are then determined for each arm 138, 140 based on the force components within said plane; namely, $f_{Y1}$, $f_{X2}$ and $f_{Y2}$. The resultant force vectors $f_1$, $f_2$ are then expressed within the global reference coordinate system 10, with the connectors 142, 144 forming their respective origin since it is through these connectors 142, 144 that an applied force is transmitted from the finger element 132 to the linkage assembly 136. The global reference coordinate system 10 is determined with respect to characteristics of the current state of the linkage assembly 136, such as the angle $\alpha$ of the active and passive arms 138, 140 with respect to a common vertical axis, defined in this example of the y-axis of the global reference coordinate system 10. Lines of action 158, 160 for the resultant force vectors $f_1$, $f_2$ are then determined within the global reference coordinate system 10 and a point $p_0$ at which the lines of action 158, 160 intersect is determined. An applied force vector $f_3$ is then determined based on a sum of the resultant force vectors $f_1$, $f_2$. The applied force vector $f_3$ is then transposed within the global reference coordinate system 10, such that its origin and the point of intersection $p_0$ coincide. A line of action 162 for the applied force vector $f_3$ is then determined within the global reference coordinate system 10 and a point $p_1$ at which the line of action 162 for the applied force vector $f_3$ and the finger element 132 intersect is determined. The applied force vector $f_3$ is then projected at point $p_1$ on the gripping surface 133 of the finger element 132, and force components $f_{Z1}$ and $f_{Z2}$ are then added to the applied force vector $f_3$ in order to determine the force acting on the finger element 132. This method 300 is shown as a flowchart in FIG. 6.

The foregoing description has been presented for the purposes of illustration only and is not intended to be exhaustive or to limit the invention to the precise example disclosed. It will be appreciated that modifications and variations can be made to the described example without departing from the scope of the invention as defined in the appended claims. In particular it should be noted that although the invention has been described within the context of applying the sensor assembly 146 to a linkage assembly 136 resembling a standard parallel bar mechanism, it is envisioned that invention is equally suitable for use with other sorts of linkage arrangements.

The invention claimed is:

1. A control system configured for a gripper assembly of a robotic manipulator, which gripper assembly includes a finger element; an actuator; a linkage assembly including a plurality of arms connecting the finger element to the actuator; and a sensor assembly configured to output signals indicative of force components applied to the plurality of arms, the control system comprising a controller configured to:

determine, based on signals received from the sensor assembly, values indicative of force components applied to each of the plurality of arms as a result of a force being applied to the finger element;

determine, based on the values indicative of the force components, a value indicative of a resultant force vector applied to each of the plurality of arms with respect to a reference coordinate frame;

determine, within the reference coordinate frame, a line of action for each of the values indicative of the resultant force vectors;

determine a point of intersection, within the reference coordinate frame, at which the lines of action intersect;

determine, based on a sum of the values indicative of the resultant force vectors, a value indicative of an applied force vector indicative of a magnitude and a direction of the force applied to the finger element;

modify the value indicative of the applied force vector such that an origin of the applied force vector has the same coordinates within the reference coordinate system as the point of intersection;

determine, within the reference coordinate frame, a line of action for the value indicative of the applied force vector; and determine a point of intersection, within the reference coordinate frame, at which the line of action for the applied force vector and the finger element intersect.

2. A control system according to claim 1, wherein the controller is configured to:

determine the reference coordinate system with respect to characteristics of the linkage assembly.

3. A method of determining a force applied to a finger element of a gripper assembly of a robotic manipulator, the gripper assembly including:

an actuator;

a linkage assembly including a plurality of arms connecting the finger element to the actuator; and a sensor assembly configured to output signals indicative of force components applied to the plurality of arms;

the method comprising:

determining, based on signals outputted by the sensor assembly, force components applied to each of the plurality of arms as a result of a force being applied to the finger element;

determining, based on the force components, a resultant force vector applied to each of the plurality of arms with respect to a reference coordinate frame;

determine, within the reference coordinate frame, a line of action for each of the values indicative of the resultant force vectors;

determine a point of intersection, within the reference coordinate frame, at which the lines of action intersect;

determining, based on a sum of the resultant force vectors, an applied force vector indicative of a magnitude and a direction of the force applied to the finger element;

transposing the applied force vector, within the reference coordinate frame, such that an origin of the applied force vector and the point of intersection coincide;

determine, within the reference coordinate frame, a line of action for the value indicative of the applied force vector; and determine a point of intersection, within the reference coordinate frame, at which the line of action for the applied force vector and the finger element intersect.

4. A method according to claim 3, comprising:

determining the reference coordinate system with respect to characteristics of the linkage assembly.

5. A non-transitory, computer-readable storage medium storing instructions thereon that, when executed by one or more electronic processors, will cause the one or more electronic processors to carry out a method according to claim 3.

* * * * *